United States Patent
Park et al.

(10) Patent No.: US 7,067,224 B2
(45) Date of Patent: Jun. 27, 2006

(54) METHOD FOR FABRICATING A LIQUID CRYSTAL DISPLAY DEVICE

(75) Inventors: Sung Il Park, Taegu-kwangyokshi (KR); Choel Min Woo, Sangju-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/000,976

(22) Filed: Dec. 2, 2004

(65) Prior Publication Data

US 2005/0142465 A1 Jun. 30, 2005

(30) Foreign Application Priority Data

Dec. 27, 2003 (KR) .................... 10-2003-0098152

(51) Int. Cl.
*G02F 1/1335* (2006.01)

(52) U.S. Cl. .......................... 430/7; 430/321

(58) Field of Classification Search ............... None
See application file for complete search history.

(56) References Cited

U.S. PATENT DOCUMENTS

2005/0140852 A1* 6/2005 Lee .............................. 349/73

* cited by examiner

*Primary Examiner*—John A. McPherson
(74) *Attorney, Agent, or Firm*—McKenna Long & Aldridge LLP

(57) ABSTRACT

A method for fabricating a liquid crystal display device includes forming a layer of photosensitive material over an entire surface of a first substrate, the first substrate having a first region and a second region defined thereon in which first and second LCD panel models will eventually be formed; aligning a photomask on the layer of the photosensitive material, the photomask including a light shielding material patterned to include first and second transmissive regions having first and second transmissivities, respectively, the second transmissivity being less than the first transmissivity; and selectively exposing the layer of photosensitive material with the photomask; developing the exposed layer of photosensitive material to simultaneously form first and second layers having different thicknesses within the first and second regions, respectively.

21 Claims, 5 Drawing Sheets

US 7,067,224 B2

METHOD FOR FABRICATING A LIQUID CRYSTAL DISPLAY DEVICE

This application claims the benefit of Korean Patent Application No. P2003-98152, filed on Dec. 27, 2003, which is hereby incorporated by reference for all purposes as if fully set forth herein.

BACKGROUND OF THE INVENTION

1. Field of the Invention

The present invention relates to methods for fabricating a liquid crystal display (LCD) devices. More particularly the present invention relates to a method for fabricating an LCD while implementing a Multi-Model on Glass (MMG) technique with improved productivity.

2. Discussion of the Related Art

As information technology continues to evolve, the demand for, and development of, various types of flat panel display devices (e.g., liquid crystal display (LCD), plasma display panel (PDP), electroluminescent display (ELD), and vacuum fluorescent display (VFD)) increases. Among the various types of flat panel display devices, LCD devices are advantageously lightweight, dimensionally compact, consume relatively low amounts of power in their operation, display images at high resolution and high luminance, and can display images on a large-sized screen. Accordingly, LCD devices are widely used, for example, as substitutes for Cathode Ray Tubes (CRTs) and find numerous applications in mobile devices as such notebook computers, portable telephones, and the like, as well as in other applications such as televisions and computer monitors.

A typical LCD device includes an LCD panel for displaying images and a driver for supplying driving signals to the LCD panel. The LCD panel generally includes first and second substrates bonded to, but spaced apart from, each to form a gap therebetween. The first and second substrates are bonded together by a sealant material and a substantially uniform gap is maintained between the bonded substrates by the presence of spacers. A liquid crystal layer is formed within the gap between the first and second substrates by injecting liquid crystal material through an injection hole formed in the sealant material and into the gap.

FIG. 1 illustrates an exploded perspective view of a related art LCD panel.

Referring to FIG. 1, the related art LCD panel typically includes a lower substrate 1 bonded to an upper substrate 2 so as to maintain a gap therebetween. A liquid crystal layer 3 fills the gap between the lower and upper substrates 1 and 2.

The lower substrate 1 supports a plurality of gate lines 4 spaced apart from each other at a fixed interval and extending along a first direction; a plurality of data lines 5 spaced apart from each other at a fixed interval and extending along a second direction, substantially perpendicular to the first direction, to define a plurality of pixel regions 'P' arranged in a matrix pattern; pixel electrodes 6 formed in each of the pixel regions 'P'; and thin film transistors 'T' at crossings of the gate and data lines 4 and 5.

The upper substrate 2 supports a black matrix layer 7 that prevents light from being transmitted in regions corresponding to the pixel regions 'P' of the lower substrate 1; R, G, B color filter layers 8 that selectively transmit predetermined wavelengths of light; and a common electrode 9 that enables images to be produced.

Generally, each thin film transistor 'T' includes a gate electrode that projects from a corresponding gate line 4, a gate insulating film (not shown) on the gate electrode, an active layer (not shown) on the gate insulating film and over the gate electrode, a source electrode that projects from a corresponding data line, and a drain electrode opposing the source electrode. Typically, the pixel electrode 6 is formed of a suitably transparent conductive metal such as indium-tin-oxide (ITO).

Upon applying predetermined voltages to the pixel and common electrodes of the LCD panel described above, an electric field, vertically oriented with respect to the lower and upper substrates, is generated to alter an arrangement of liquid crystal molecules within the liquid crystal layer 3. Upon altering the arrangement of liquid crystal molecules, light transmittance characteristics of the LCD panel are selectively altered and an image can thus be expressed. The LCD panel described above has good light transmissivity characteristics and a suitable aperture ratio. Further, the common electrode 9, supported by the upper substrate 2, serves as a grounding structure that prevents damage to liquid crystal cells caused by static electricity.

A method for fabricating the related art LCD panel shown in FIG. 1 will now be described in greater detail with reference to FIGS. 2 and 3. FIG. 2 illustrates a plan view of related art first and second model LCD panels and FIG. 3 illustrates a cross-sectional view of the LCD panel across a line II–II' as shown in FIG. 2.

Referring generally to FIG. 2, a plurality of first and second LCD panel models 20 and 30, respectively, are formed on the same first and second base substrates 21 and 31, respectively. Other than their differences in panel size, the first LCD panel models 20 are essentially identical as the second LCD panel models 30 because both the first and second LCD panel models 20 and 30 are fabricated by performing the same fabrication processes (e.g., film deposition, photolithography, etc.) on the first and second substrates 21 and 31.

Thus, the second substrate 31 supports a plurality of gate lines spaced apart from each other at a fixed interval and extending along a first direction; a plurality of data lines spaced apart from each other and extending along a second direction, substantially perpendicular to the first direction, to define a plurality of pixel regions arranged in a matrix pattern; a plurality of pixel electrodes within the pixel regions; and a plurality of thin film transistors switching signals from the data lines to corresponding pixel electrodes in response to signals transmitted by corresponding gate lines.

The first substrate 21 supports a black matrix layer that prevents light from being transmitted outside areas corresponding to the pixel regions of the second substrate 1; R, G, B color filter layers that selectively transmit predetermined wavelengths of light; and a common electrode that enables images to be produced. In-Plane Switching (IPS)-type LCD panels, however, may be provided with the common electrode formed on the second substrate 31.

Referring still to FIG. 3, the aforementioned first and second substrates 21 and 31 are bonded to each other via a sealant material and a substantially uniform gap is maintained between the bonded substrates by a plurality of spacers. Accordingly, the first LCD panel models 20 include the first spacers 23 while the second LCD panel models 30 include the second spacers 33. As shown, the height of the first spacers 23 for the first LCD panel models 20 is equal to the height of the second spacers 33 for the second LCD panel models 30. Moreover, the thickness of the first color filter layers 22 of the first LCD panel models 20 is equal to the thickness of the second color filter layers 32 of the second LCD panel models 30.

As described above, the same base substrates can beneficially be used to form multiple LCD panel models (hereinafter referred to as "Multi-Model on Glass", or "MMG", technique) with varying panel sizes. Because the various LCD panels models must be fabricated using the same processes, however, it is almost impossible to implement the MMG technique while varying LCD panel characteristics other than panel size. Accordingly, implementation of related art MMG techniques can be extremely limited in scope.

SUMMARY OF THE INVENTION

Accordingly, the present invention is directed to a method for fabricating LCD devices that substantially obviates one or more of the problems due to limitations and disadvantages of the related art.

An advantage of the present invention provides a method for fabricating LCD devices while implementing MMG techniques to form LCD panel models having different characteristics other than panel size.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating an LCD device may, for example, include forming a layer of photosensitive material over an entire surface of a first substrate, the first substrate having a first region corresponding to a first LCD panel model forming region and a second region corresponding to a second LCD panel model forming region; aligning a photomask over the layer of photosensitive material, the photomask formed of a light shielding layer patterned to include a first transmissive region and a second transmissive region, the first transmissive region having first transmissivity characteristics and the second transmissive region having second transmissivity characteristics; selectively exposing the layer of photosensitive material to light via the photomask; and developing the exposed layer of photosensitive material to simultaneously form first and second layers on the first and second regions, respectively, the first and second layers having different thicknesses.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
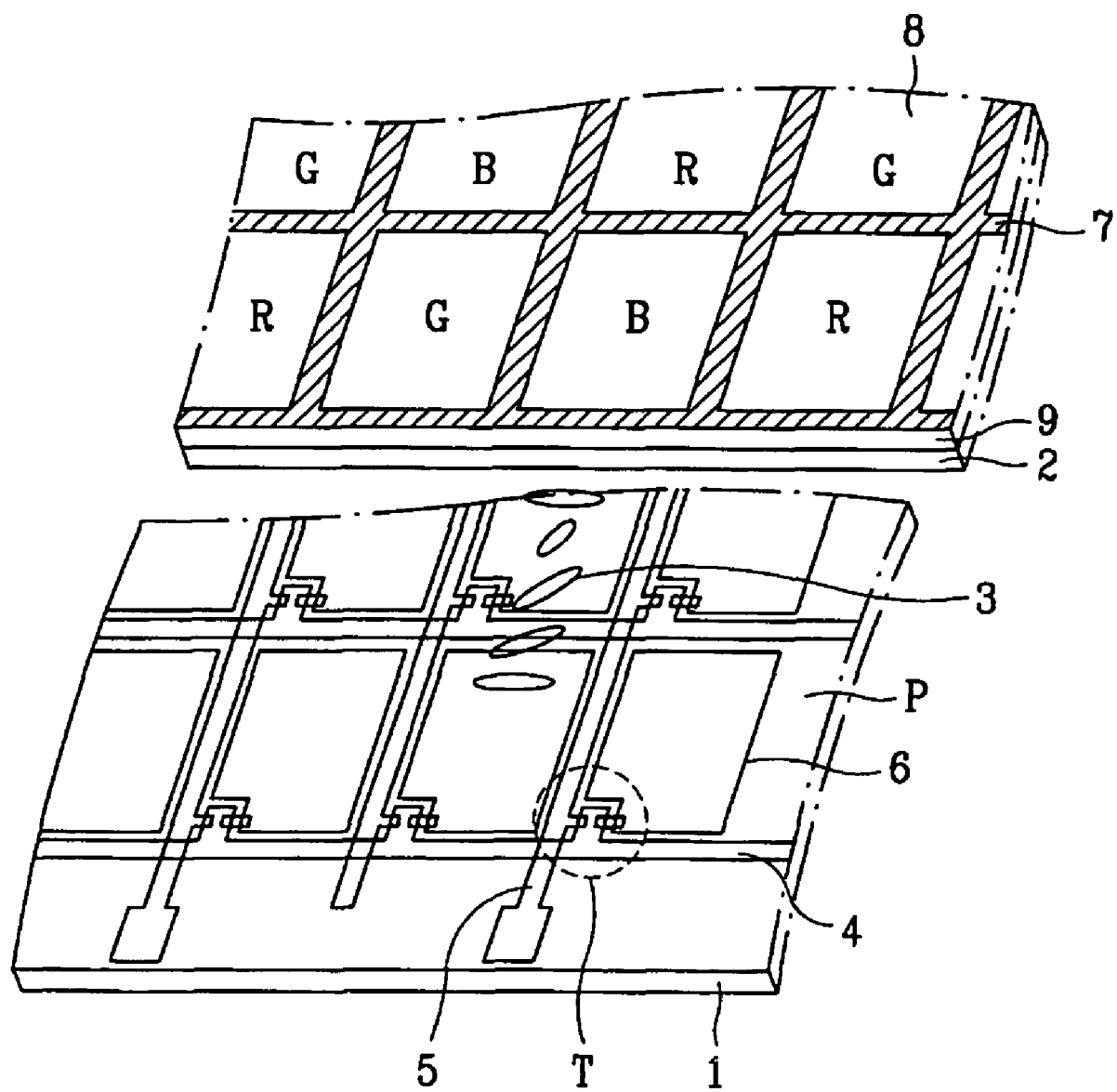
FIG. 1 illustrates an exploded perspective view of a related art LCD panel.
Figure 2:
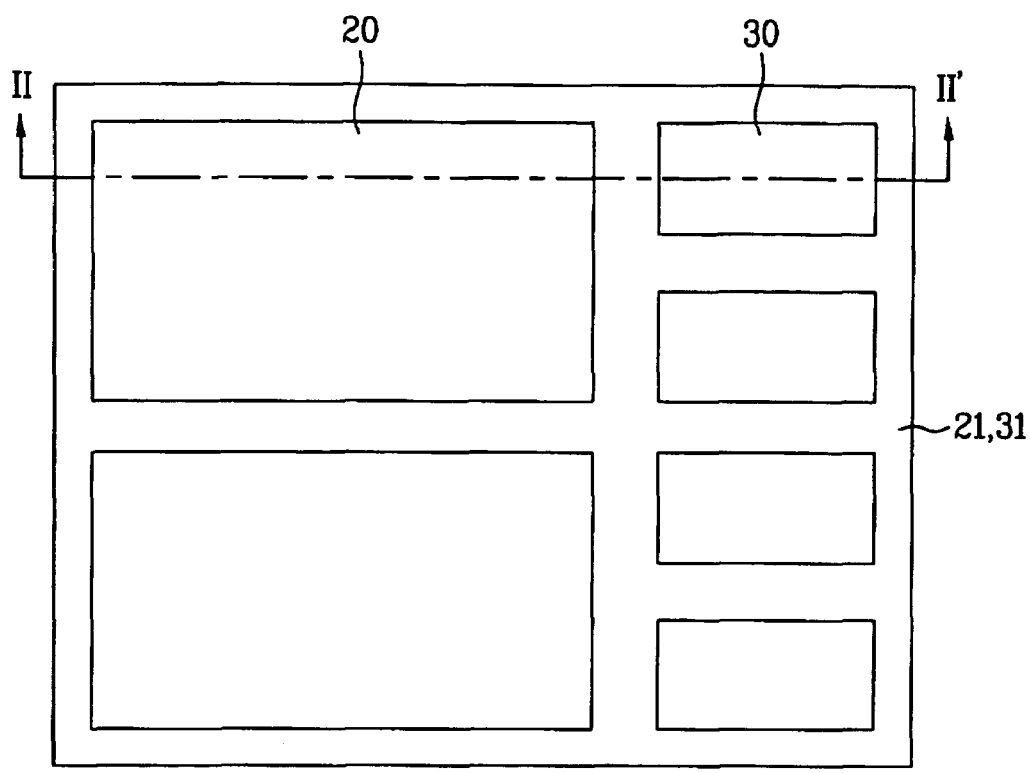
FIG. 2 illustrates a plan view of related art first and second model LCD panels.
Figure 3:
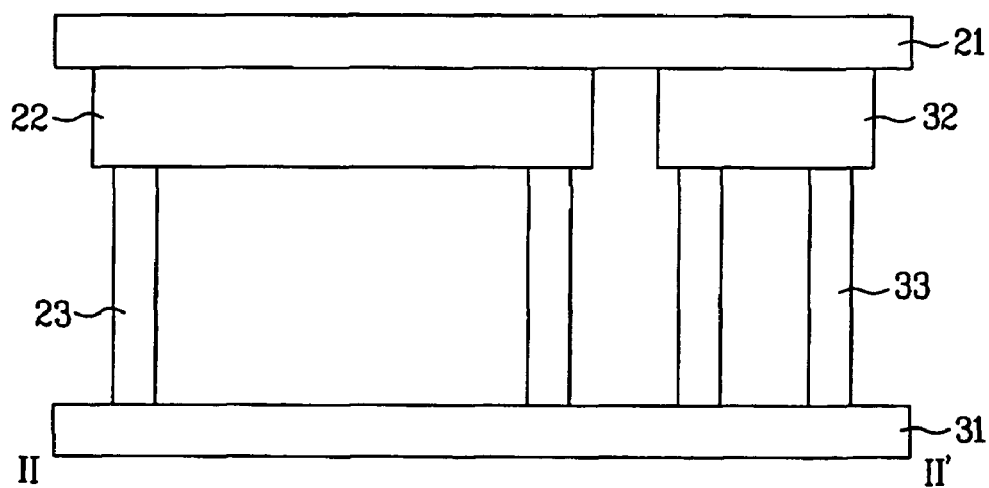
FIG. 3 illustrates a cross-sectional view of the LCD panels across line II–II' shown in FIG. 2.
Figure 4:
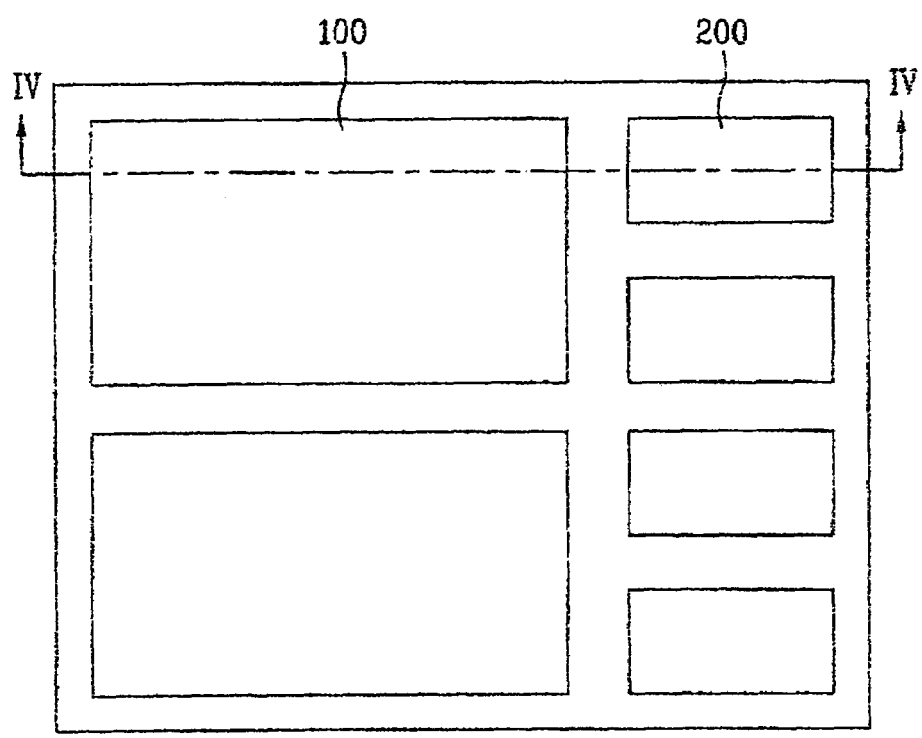
FIG. 4 illustrates a plan view of first and second model LCD panels in accordance with principles of the present invention.
Figure 5:
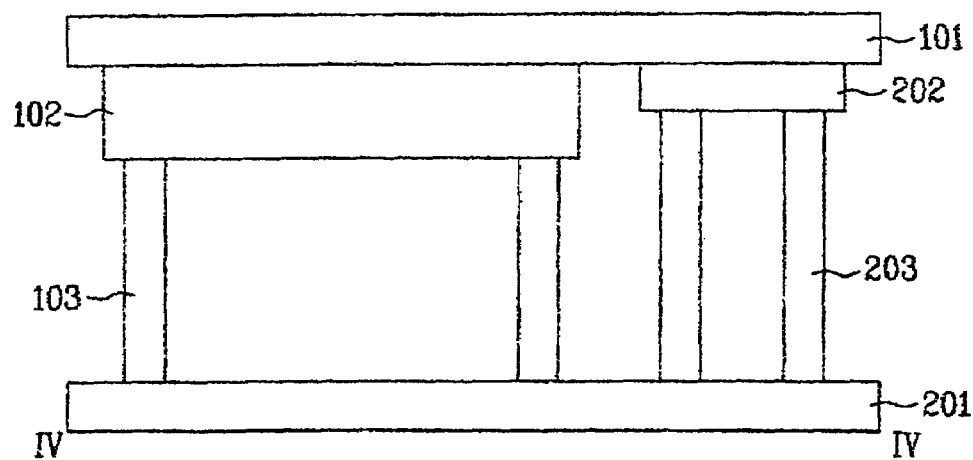
FIG. 5 illustrates a cross-sectional view of LCD panels across line IV–IV' shown in FIG. 4.

FIG. 4 illustrates a plan view of first and second model LCD panels in accordance with principles of the present invention and FIG. 5 illustrates a cross-sectional view of LCD panels across line IV–IV' shown in FIG. 4.

Referring to FIG. 4, a plurality of LCD panel models may be formed from the same base substrates. For example, a plurality of first LCD panel models 100 and a plurality of second LCD panel models 200 having different LCD panel characteristics, in addition to panel size, may be formed from the same base substrates 101 and 201.

According to principles of the present invention, the first and second LCD panel models may be fabricated by performing a plurality of film forming and photolithography processes on respective TFT array and color filter substrates. For example, and with reference to FIG. 5, the second substrate 201 may support a plurality of gate lines spaced apart from each other at a fixed interval and extending along a first direction; a plurality of data lines spaced apart from each other and extending along a second direction, substantially perpendicular to the first direction, to define a plurality of pixel regions arranged in a matrix pattern; a plurality of pixel electrodes within the pixel regions; and a plurality of thin film transistors switching signals from the data lines to corresponding pixel electrodes in response to signals transmitted by corresponding gate lines. In-Plane Switching (IPS)-type LCD panels, however, may provided with the common electrode formed on the second substrate 201. The first substrate 101 may support a black matrix layer that prevents light from being transmitted outside regions corresponding to the pixel regions of the second substrate 201; R, G, B color filter layers that selectively transmit predetermined wavelengths of light; and a common electrode that enables images to be produced.

Referring still to FIG. 5, the aforementioned first and second substrates 101 and 201, respectively, may be bonded to each other via a sealant material and a substantially uniform distance may be maintained between the bonded substrates by a plurality of spacers.

Therefore, and in accordance with principles of the present invention, the first LCD panel models 100 may include first spacers 103 while the second LCD panel models 200 may include second spacers 203. As shown, the height of the first spacers 103 included within the first LCD panel models 100 may be different from (e.g., less than) the height of second spacers 203 included within the second LCD panel models 200. Moreover, the thickness of the first color filter layers 102 included within the first LCD panel models 100 may be different from (e.g., thicker than) the thickness of the second color filter layers 202 included within the second LCD panel models 200.

Constructed as described above, the panel characteristics of the first LCD panel model 100, in addition to the panel size, may be different than corresponding panel characteristics of the second LCD panel model 200. Thus, because the first and second color filter layers 102 and 202 have different thicknesses, the first LCD panel model 100 may, for example, have a higher color reproducibility, lower light transmissivity than the second LCD panel model 200. Moreover, because the height of gap the in the first LCD panel model 100 is less than the height of gap the in the second LCD panel model 200, the first LCD panel model 100 may have a higher response speed than the second LCD panel model 200. Stated alternatively, the second LCD panel model 200 may have a lower color reproducibility, higher light transmissivity, and a lower response speed, than the first LCD panel model 100.

FIGS. 6A to 6D illustrate a method for fabricating LCD panels in accordance with principles of the present invention.

Figure 6A:
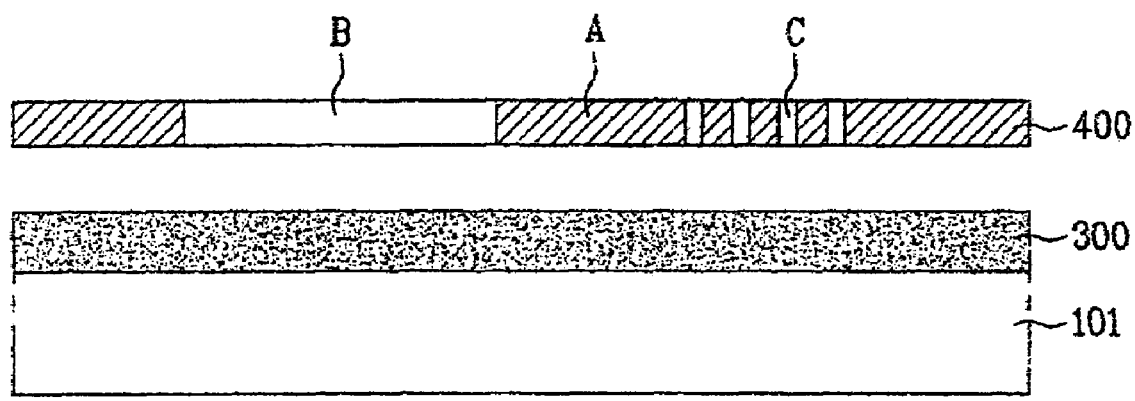
FIGS. 6A to 6D illustrate a method for fabricating LCD panels in accordance with principles of the present invention.

Referring to FIG. 6A, a layer of photosensitive material 300, capable of transmitting light within a predetermined range of wavelengths, may be formed on a first substrate 101. In one aspect of the present invention, the photosensitive material 300 may include a material capable of transmitting wavelengths associated with the color red, green, blue, and the like. A photomask 400 may then be aligned over the photosensitive material 300. In one aspect of the present invention, the photomask 400 may generally include a patterned light shielding layer 'A' that transmits substantially no light. In another aspect of the present invention, the photomask 400 may include a first transmissive region 'B', having a first transmissivity suitable for transmitting light, and a second transmissive region 'C', having a second transmissivity that is lower than the first transmissivity for transmitting a fraction of the light transmitted by the first transmissive region 'B'. In still another aspect of the present invention, the second transmissive region 'C' may be provided as a plurality of slits arranged within the light shielding layer 'A'.

According to principles of the present invention, the photosensitive material 300 may be provided as a negative-type photosensitive material that, upon being developed, remains where it has been exposed to light. Alternatively, however, the photosensitive material 300 may be provided as a positive photosensitive material that, upon being developed, remains where it has been shielded from light. Thus, where the photosensitive material 300 is provided as a positive photosensitive material, the arrangement of the first and second transmissive regions 'B' and 'C' may be altered as desired.

Figure 6B:
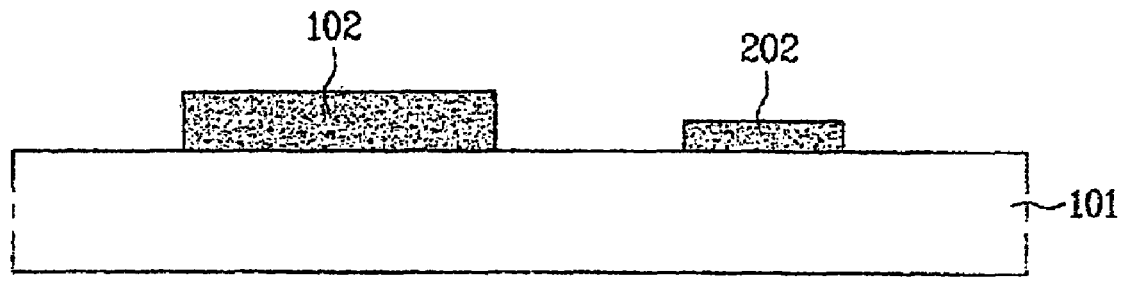

After the photomask 400 is aligned over the photosensitive material 300, light (e.g., UV light) may be irradiated onto the substrate 101. Accordingly, only portions of the photosensitive material 300 beneath the first and second transmissive regions 'B' and 'C' of photomask 400 may be exposed to the irradiated light. Because the second transmissive region 'C' transmits only a fraction of light transmitted by the first transmissive region 'B', the portion of photosensitive material 300 beneath the second transmissive region 'C' is exposed to a smaller amount of light than the portion of photosensitive material 300 beneath the first transmissive region 'B'. With reference to FIG. 6B, the exposed photosensitive material 300 may then be developed to simultaneously form first and second color filter layers 102 and 202, respectively. Because the portion of photosensitive material 300 beneath the second transmissive region 'C' is exposed to a smaller amount of light than the portion of photosensitive material 300 beneath the first transmissive region 'B', the portion of photosensitive material 300 beneath the second transmissive region 'C' may, after development, be thinner than the portion of photosensitive material 300 beneath the first transmissive region 'B'. Accordingly, the thickness and width of the first color filter layer 102 may be different from the thickness and width of the second color filter layer 202.

Figure 6C:
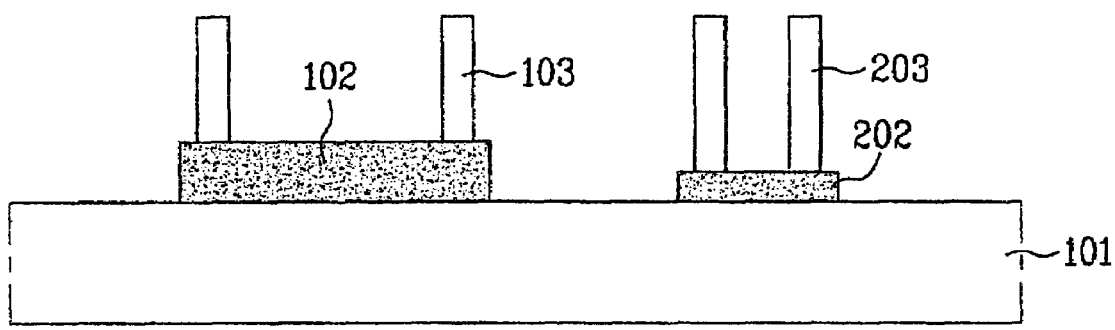

Referring to FIG. 6C, an insulating film may be formed over the entire surface of the first substrate 101, including over the first and second color filter layers 102 and 202, respectively. In one aspect of the present invention, the insulating film may form a substantially planar upper surface. Next, the insulating film may be selectively removed by photolithography and etching processes to form a plurality of first and second column spacers 103 and 203, respectively, on opposing side edges of the first and second color filter layers 102 and 202, respectively. According to principles of the present invention, the first and second column spacers 103 and 203 may be simultaneously formed to have different heights because the first and second color filter layers 102 and 202 on which they are formed have different thicknesses.

Figure 6D:
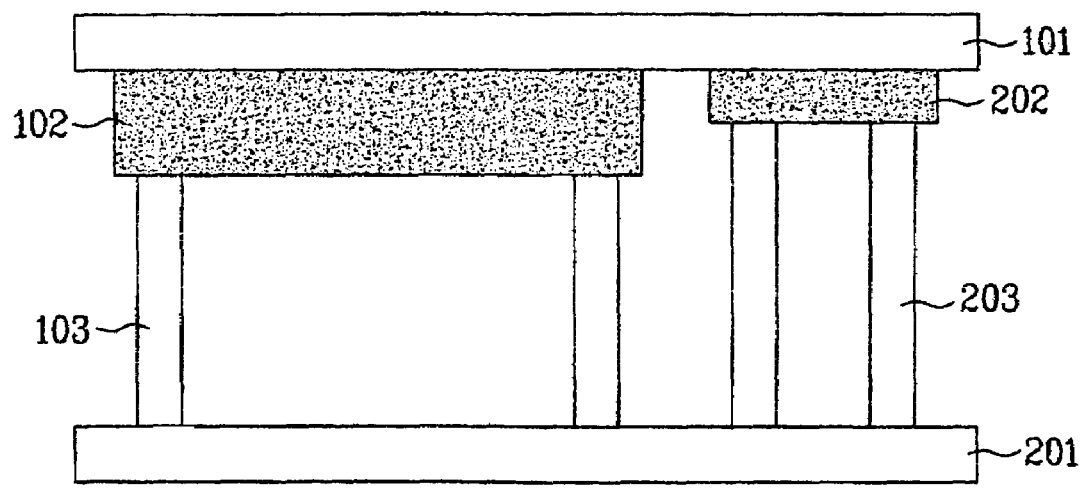

Referring to FIG. 6D, after the first and second column spacers 103 and 203 are formed, a second substrate 201 may be bonded to the first substrate 101 and contact the first and second column spacers 103 and 203. According to principles of the present invention, the second substrate 201 may, for example, support a plurality of gate lines spaced apart from each other at a fixed interval and extending along a first direction; a plurality of data lines spaced apart from each other and extending along a second direction, substantially perpendicular to the first direction, to define a plurality of pixel regions arranged in a matrix pattern; a plurality of pixel electrodes within the pixel regions; and a plurality of thin film transistors switching signals from the data lines to corresponding pixel electrodes in response to signals transmitted by corresponding gate lines. While it has been described above that the first and second column spacers 103 and 203 are formed on the first substrate 101, it should be noted that at least one of the first and second column spacers 103 and 203 may, alternatively, be formed on the second substrate 201.

After the first and second substrates 101 and 201 have been bonded to each other, liquid crystal material may be filled into the gap between the bonded substrates to form a plurality of LCD panels. Thus, in accordance with principles of the present invention, a plurality of first LCD panel models 100 and a plurality of second LCD panel models 200 may be formed using the same base substrates, wherein the first and second LCD panel models have different panel characteristics (e.g., color reproducibility, light transmissivity, response speed, etc.) in addition to panel size. Consequently, when implementing MMG techniques according to principles of the present invention, the sizes, liquid crystal modes, viewing angles, alignment directions, alignment methods, color reproducibility, and the like, of the various LCD panel models must be taken into account.

For example, the first and second LCD panel models 100 and 200 may include the same or different alignment directions, in addition to different panel sizes. In one aspect of the present invention, alignment directions of the first and second LCD panel models 100 and 200 may be formed according to a physical treatment (e.g., a rubbing treatment). For example, a base substrate may be rubbed along one direction with a rubbing cloth attached to a rotating drum to form straight grooves running in one direction. Formed using the rubbing method described above, the first and second LCD panel models 100 and 200 may have alignment directions oriented at either 0° or 180° with respect to each other. As is generally known, the viewing angle of an LCD panel is heavily dependent upon the alignment direction of the LCD panel. Thus, if the alignment direction of one LCD panel model changes, the alignment direction (and thus the viewing angle characteristics) of another LCD panel model also changes. To overcome this potentially undesirable effect, alignment directions of the first and second LCD panel models 100 and 200 may be formed according to a UV irradiation method or at least one of the LCD panel models may be provided as a vertical alignment (VA)-mode LCD panel, or the like, that does not require the formation of alignment directions by rubbing or UV irradiation to induce an orientation of liquid crystal molecules within a liquid crystal layer.

In one aspect of the present invention, UV light may be irradiated to the substrate by causing a UV light source to emit UV light, transmitting the emitted UV light through a lens, uniformly transmitting the resultant UV light through a polarizer, and directing the polarized UV light to a substrate at a predetermined incident angle. In another aspect of the present invention, the polarized UV light may be selectively directed to predetermined portions of the substrate. As a result, only the portion of the material exposed to the incident UV light is altered to form straight grooves along a predetermined direction. For example, a first UV irradiation may be performed on a selectively exposed portion of a substrate corresponding to, for example the first LCD panel models 100. Subsequently, the substrate may be rotated and a second UV irradiation may be performed on a different, selectively exposed, portion of the substrate corresponding to, for example the second LCD panel models 200. Accordingly, a plurality of alignment directions may be formed within the various LCD panel models to induce an orientation of liquid crystal molecules within the liquid crystal layer.

In one aspect of the present invention, an orientation of liquid crystal molecules within a liquid crystal layer may be induced not by the formation of straight grooves (formed via rubbing or irradiation with light) but by the provision of an alignment structure that perturbs an electric field (e.g., a slit, a protrusion, a fringe field, etc.) present in, for example, VA-mode LCD panels. In VA-mode LCD panels, liquid crystal molecules of negative-type liquid crystal material are oriented perpendicular to the alignment structures when no voltage is applied to the pixel and common electrodes. When a voltage is applied, domains of different orientations are formed within the liquid crystal layer and an alignment boundary is formed between the alignment structure.

According to principles of the present invention, the first and second LCD panel models may be provided as TN (Twist Nematic)-, STN (Super Twist Nematic)-, IPS (In-plane Switching)-, VA-mode LCD panels, and the like. However, because each of the various modes of LCD panels are fabricated using different processes, only first and second LCD panel models 100 and 200 of the same mode can be formed using the same base substrates.

As described above, MMG techniques may be implemented to form LCD panel models of the same mode but having different panel characteristics (e.g., color reproducibility, light transmissivity, response speed, etc.) in addition to differences in panel size and alignment directions. For example, the photomask 400, having the first and second transmissive regions 'B' and 'C' formed within the patterned light shielding layer 'A', may be used to simultaneously form first and second color filter layers 102 and 202 having different thickness and widths. Thus, the efficiency with which base substrates are used can be maximized.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) device, comprising:
   forming a layer of photosensitive material over a first substrate having a first region and a second region defined thereon;
   arranging a photomask over the layer of photosensitive material, the photomask formed of a light shielding layer patterned to include a first transmissive region and a second transmissive region, the first transmissive region having first transmissivity characteristics and the second transmissive region having second transmissivity characteristics; and
   selectively exposing the layer of photosensitive material to light via the photomask;
   developing the exposed layer of photosensitive material to form first and second layers on the first and second regions, respectively, wherein the first and second layers have different thicknesses; and
   forming at least one first LCD panel model within the first region and at least one second LCD panel model within the second region.

2. The method as claimed in claim 1, wherein the first and second layers include color filter layers.

3. The method as claimed in claim 1, wherein the layer of photosensitive material includes one selected from red photosensitive material, green photosensitive material, and blue photosensitive material.

4. The method as claimed in claim 1, further comprising forming column spacer layers on the first and second layers.

5. The method as claimed in claim 1, further comprising forming column spacer layers on the first substrate.

6. The method as claimed in claim 1, wherein the second transmissive region include a plurality of slits within the light shielding layer, wherein a transmissivity of the second transmissive region is less than a transmissivity of the first transmissive region.

7. The method as claimed in claim 1, further comprising bonding a second substrate to the first substrate after the developing, wherein a distance between the first and the second substrates is substantially constant within the first and second regions.

8. The method as claimed in claim 7, further comprising forming a plurality of column spacers on the second substrate.

9. The method as claimed in claim 7, further comprising forming a liquid crystal layer between the first and second substrates.

10. The method as claimed in claim 1, wherein the first LCD panel model and the second LCD panel model have different color reproducibility characteristics.

11. The method as claimed in claim 1, wherein the first LCD panel model and the second LCD panel model have different light transmittance characteristics.

12. The method as claimed in claim 1, wherein the first LCD panel model and the second LCD panel model have different response speeds.

13. The method as claimed in claim 1, wherein the first LCD panel model and the second LCD panel model have different panel sizes.

14. The method as claimed in claim 1, wherein the first LCD panel model and the second LCD panel model have the same liquid crystal mode.

15. The method as claimed in claim 14, the first LCD panel model and the second LCD panel model have a vertical alignment mode, an in-plane switching mode, a twist nematic mode, or a super twist nematic mode.

16. The method as claimed in claim 1, further including forming a first alignment direction within the first LCD panel model and a second alignment direction within the second LCD panel model.

17. The method as claimed in claim 16, wherein the first alignment direction is the same as the second alignment direction.

18. The method as claimed in claim 16, wherein the first alignment direction is different from the second alignment direction.

19. The method as claimed in claim 16, wherein forming the first and second alignment directions includes performing a physical alignment process.

20. The method as claimed in claim 16, wherein the first alignment direction is oriented at an angle of about 90°, about 180°, or about 270° with respect to the second alignment direction.

21. The method as claimed in claim 16, wherein forming the first and second alignment directions includes performing at least one UV irradiation process.

* * * * *